US 8,749,934 B2

(12) United States Patent
Hackenberg

(10) Patent No.: US 8,749,934 B2
(45) Date of Patent: Jun. 10, 2014

(54) REVERSE CURRENT SENSOR

(75) Inventor: Gerd Hackenberg, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 7 days.

(21) Appl. No.: 13/366,522

(22) Filed: Feb. 6, 2012

(65) Prior Publication Data
US 2012/0139347 A1 Jun. 7, 2012

Related U.S. Application Data

(63) Continuation of application No. PCT/EP2010/060761, filed on Jul. 26, 2010.

(30) Foreign Application Priority Data

Aug. 6, 2009 (EP) .................................... 09167379

(51) Int. Cl.
*H02H 3/16* (2006.01)
*H02J 1/00* (2006.01)
(52) U.S. Cl.
USPC ................................ 361/84; 136/244; 307/77
(58) Field of Classification Search
USPC ........................................................ 361/84
See application file for complete search history.

(56) References Cited

U.S. PATENT DOCUMENTS

| 6,515,215 | B1 * | 2/2003 | Mimura ........................ 136/244 |
| 6,593,520 | B2 * | 7/2003 | Kondo et al. .................. 136/244 |
| 6,653,549 | B2 * | 11/2003 | Matsushita et al. ........... 136/244 |
| 6,812,396 | B2 * | 11/2004 | Makita et al. .................. 136/244 |
| 7,449,798 | B2 | 11/2008 | Suzuki et al. |
| 7,772,716 | B2 * | 8/2010 | Shaver et al. .................... 307/31 |
| 7,919,953 | B2 * | 4/2011 | Porter et al. .................. 323/222 |
| 7,969,700 | B2 * | 6/2011 | Coloma Calahorra et al. . 361/84 |
| 7,989,983 | B2 * | 8/2011 | Folts et al. ....................... 307/82 |
| 8,004,116 | B2 * | 8/2011 | Ledenev et al. ................. 307/80 |
| 8,049,523 | B2 | 11/2011 | Gazit |

(Continued)

FOREIGN PATENT DOCUMENTS

DE    10247776 A1    4/2004
EP    1403649 B1    11/2006

(Continued)

OTHER PUBLICATIONS

International Search for International Application No. PCT/EP2010/060761.

(Continued)

*Primary Examiner* — Jared Fureman
*Assistant Examiner* — Angela Brooks
(74) *Attorney, Agent, or Firm* — Eschweiler & Associates, LLC

(57) ABSTRACT

In a photovoltaic system including a plurality of strings, each includes a plurality of photovoltaic modules exclusively connected in series, bus lines to which the strings are connected in parallel, and a converter for feeding electric energy from the bus lines into a power grid. A system voltage drop between the bus lines can be adjusted by a controller of the converter, and a current sensor is provided for each string that at least determines whether a reverse current flows to the string and reports to the controller of the converter whether a reverse current flows to the string, and the controller of the converter reduces the system voltage present between the bus lines to stop the reverse current.

20 Claims, 2 Drawing Sheets

(56) References Cited

U.S. PATENT DOCUMENTS

| | | | |
|---|---|---|---|
| 8,218,274 B2* | 7/2012 | Hastings et al. | 361/42 |
| 8,289,742 B2* | 10/2012 | Adest et al. | 363/71 |
| 8,344,549 B2* | 1/2013 | Loh et al. | 307/82 |
| 2001/0023703 A1* | 9/2001 | Kondo et al. | 136/244 |
| 2002/0014262 A1* | 2/2002 | Matsushita et al. | 136/244 |
| 2004/0056768 A1* | 3/2004 | Matsushita et al. | 340/541 |
| 2004/0066094 A1 | 4/2004 | Suzuki et al. | |
| 2006/0162772 A1* | 7/2006 | Presher et al. | 136/290 |
| 2006/0231132 A1* | 10/2006 | Neussner | 136/244 |
| 2007/0107767 A1* | 5/2007 | Hayden et al. | 136/244 |
| 2008/0111517 A1* | 5/2008 | Pfeifer et al. | 320/101 |
| 2009/0085404 A1 | 4/2009 | Suzuki et al. | |
| 2009/0101191 A1* | 4/2009 | Beck et al. | 136/244 |
| 2009/0121549 A1* | 5/2009 | Leonard | 307/51 |
| 2009/0145480 A1 | 6/2009 | Adest et al. | |
| 2009/0146671 A1 | 6/2009 | Gazit | |
| 2009/0147554 A1 | 6/2009 | Adest et al. | |
| 2009/0302681 A1 | 12/2009 | Yamada et al. | |
| 2011/0006609 A1* | 1/2011 | Loh et al. | 307/82 |
| 2011/0139213 A1* | 6/2011 | Lee | 136/244 |
| 2011/0203635 A1* | 8/2011 | Beck | 136/244 |
| 2011/0210611 A1* | 9/2011 | Ledenev et al. | 307/71 |
| 2011/0301772 A1* | 12/2011 | Zuercher et al. | 700/293 |
| 2012/0007613 A1 | 1/2012 | Gazit | |
| 2012/0048325 A1* | 3/2012 | Matsuo et al. | 136/244 |
| 2012/0048326 A1* | 3/2012 | Matsuo et al. | 136/244 |
| 2012/0056638 A1* | 3/2012 | Swahn | 324/761.01 |
| 2012/0113554 A1* | 5/2012 | Paoletti et al. | 361/63 |
| 2012/0139347 A1* | 6/2012 | Hackenberg | 307/71 |
| 2012/0280567 A1* | 11/2012 | Buller et al. | 307/43 |
| 2013/0015875 A1* | 1/2013 | Kumar | 324/761.01 |

FOREIGN PATENT DOCUMENTS

| | | |
|---|---|---|
| EP | 1986306 A1 | 10/2008 |
| EP | 1387462 B1 | 3/2010 |
| JP | H 09182279 | 7/1997 |
| JP | 2004254386 | 9/2004 |
| WO | 2007048421 A2 | 5/2007 |
| WO | 2009073867 A1 | 6/2009 |

OTHER PUBLICATIONS

Sunny Family Catalog 2009-2010. SMA Solar Technology AG.

* cited by examiner

REVERSE CURRENT SENSOR

REFERENCE TO RELATED APPLICATIONS

This application is a continuation application of PCT/EP2010/060761, filed on Jul. 26, 2010, that claims priority to European Patent Application EP 09 167 379.8, filed on Aug. 6, 2009, the contents of which are incorporated by reference in their entirety.

FIELD

The invention relates to a photovoltaic system as well as to an apparatus for feeding electric energy from a plurality of strings each of which comprises a plurality of photovoltaic modules connected in series into a power grid. The apparatus provides the units which, beside the strings and their cabling, are required for feeding electric energy from the strings into a power grid. Such apparatus are often supplied by other specialized companies than the strings and their cabling.

BACKGROUND

In a usual photovoltaic system, a plurality of strings of photovoltaic modules are connected in parallel to achieve the desired electric power at a limited voltage. The individual strings have to be protected against the occurrence of reverse currents, i.e. of currents which have a reversed flow direction as compared to the currents generated in the proper operation of the photovoltaic modules of the respective string. In principle, a reverse current may only occur if the open terminal voltages or open-circuit voltages differ between the strings connected in parallel. Usually, this is avoided with strings of equal length, i.e. with strings built of a same number of solar modules, which are the normal case. Even with shading of the solar modules of an individual string, no significant reverse current occurs through this string, as the shading has no significant influence on the terminal voltage. Instead, the occurrence of reverse currents requires the presence of a fault, for example due to one or more solar modules of a string being shorted such that the open terminal voltage of the string clearly falls below the open terminal voltage of the strings connected in parallel thereto. Due to the internal diode structure of the solar modules, a reverse current may then flow through the faulty string which—depending on the current strength—may result in a strong rise in temperature up to a destruction of the solar modules of the strings. The short circuit of a photovoltaic module may be caused by a short circuit of one or more cells in the photovoltaic module or by a double ground fault of a photovoltaic module or of its cabling. Even if these faults are very unlikely, i.e. occur only very rarely in practice, arrangements have to be made as these faults hold a high damage and risk potential as all photovoltaic modules of the affected string may be damaged, and secondary damages may also occur due to local heating. Thus, there is the requirement to avoid the occurrence of reverse currents through individual strings that are connected in parallel in a photovoltaic system.

In the product Sunny String Monitor (http://download.sma.de/smaprosa/dateien/7356/SSM-UDE091221.pdf, product catalogue: Sunny Family 2009/2010 page 82) it is known for avoiding reverse currents to secure the individual strings within their parallel connection by string fuses which disconnect a faulty string from the other strings connected in parallel. Upon tripping of one string fuse due to a fault in the respective string, a warning is issued that identifies the faulty string. With the output voltages of the individual strings tending to increase, presently they are up to more than 1000 V, such string fuses are complex and correspondingly expensive. Further, the use of usual melting fuses is associated with a permanent loss of power. This loss of power also occurs, if, instead of fuses, diodes blocking the reverse currents are provided for the individual strings. For continuous monitoring the individual strings for smaller faults or power losses that point to a creeping or approaching breakdown, the product Sunny String Monitor comprises one current sensor per string. This current sensor determines the strength of the current generated by the respective string. For failure monitoring of the strings connected in parallel, the current flowing from all strings in operation are collectively evaluated, i.e. with regard to the relative values of the currents flowing from the individual strings.

The product Sunny String Monitor is provided for use together with an inverter for feeding electric energy from the strings into an AC grid. In the inverter, a controller operates an inverter bridge in such a way that a system voltage present between the bus lines, to which the strings are connected in parallel, is adjusted with regard to a maximum electric power of the strings. This procedure is known as MPP (Maximum Power Point) tracking, wherein the maximum electric power of the strings is usually adjusted within a range of generally possible system voltages, i.e. within the so-called MPP window.

Another prior art photovoltaic system is known from WO 2007/048421 A2. Here, a mechanical switch is additionally provided in one connection line of each string, which is opened to disconnect the respective string in case of occurrence of a reverse current from the bus lines. To protect this mechanical switch from damage due to a spark gap forming between its contacts, a semiconductor switch is provided between the bus lines to short them temporarily upon opening and also upon eventually closing the switch.

SUMMARY

According to the invention, one current sensor is provided for each string which at least determines whether a reverse current flows to the respective string and which reports the reverse current to the controller. Here, the term reverse current refers to a significant current that comprises a reversed flow direction as compared to the currents generated by the photovoltaic modules of the respective string in proper operation and which is due to a fault of the respective string. As a reaction to the report of the reverse current, the controller reduces the system voltage that is present between the bus lines to stop the reverse current. The system voltage present between the bus lines is that voltage which causes the reverse current. If it is reduced, a voltage may be reached or even undercut which even the faulty string comprises as a terminal voltage or which even the faulty string may block. Thus, a continued flow of the reverse current is stopped without the need to provide a fuse or any other switching element for the affected string. After the reduction of the voltage between the bus lines, the other strings further supply electric energy which is fed into the power grid by the inverter as long as the reduced voltage between the bus lines is sufficient for feeding electric energy into the power grid. Particularly then, when the controller only needs to slightly reduce the system voltage between the bus lines below the present MPP to stop the reverse current, the losses of electric energy which are no longer fed into the power grid are essentially limited to the contribution of the faulty string which could also not be fed in case of switching off the string by switching elements, which would be an alternative to the present invention. In addition to that there is a small loss due to the misfit of the system voltage (abandonment of the MPP).

If the controller has to further reduce the system voltage present between the bus lines below the MPP within the present MPP window, because the reverse current can not be stopped otherwise, the electric power fed into the power grid is clearly reduced below the maximum power which could be potentially fed by the still functioning strings. The associated power losses, however, are only small in most cases. Particularly, they are not of weight in view of the rarity of the occurrence of reverse currents in practice and of the low effort for realizing the new photovoltaic system or the new apparatus, as any fuse and any switching element for the individual strings can be avoided and as a current sensor—in contrast to a fuse, any other switching element or a reverse current blocking diode—is not associated with significant permanent power losses.

When the controller would have to reduce the system voltage present between the bus lines below a value which may not be undercut for feeding into the power grid for stopping the reverse current, the system voltage is reduced to zero and no further energy is fed into the grid. For this purpose, the controller may short the system voltage present between the bus lines. If the converter for feeding into an AC power grid is a usual inverter with an inverter bridge comprising pulsed switches, this may be implemented in that the inverter is, at first, separated from the AC grid by opening contactors which serve for connecting the photovoltaic system to the AC grid and a buffer capacitance at the input side of the inverter is discharged by shorting via a discharge resistor, and that, then, the bus lines are directly connected to each other by closing the switches of the inverter bridge. Such a shorting of the bus lines has the result that no more electric energy from the photovoltaic system is fed into the power grid. However, even the losses associated herewith are only low in the light of the rarity of their occurrence and the considerable constructional savings in providing the new photovoltaic system or the new apparatus and their high efficiency in normal operation.

In one embodiment, the current sensors are provided in connection units for local arrangement, by which several strings are connected to a pair of connection lines in the field, before these connection lines are guided to a central unit which includes the converter and at which terminals for the local connection units to the bus lines are provided.

As the controller of the converter is located in the central unit whereas the current sensors are provided in the connection units, communication links are provided between the connection units and the central unit. These may be communication lines or radio transmission or other wireless signal transmitting links by which the laying of additional communication lines is saved. Retrofitting existing photovoltaic systems in the sense of the present invention is also easier if the current sensors in the connection units report a reverse current wirelessly to the controller of the converter in the central unit.

The current sensors that are employed according to the invention may be of a very simple construction, if they are only provided to report the occurrence of a reverse current that exceeds a predetermined threshold value. In one embodiment, the signal of the reverse current sensor, in the minimum case, only includes the presence of the reverse current, and the controller of the converter does not need to recognize in which string the reverse current occurs, although this additional information is helpful to remove the causative fault. Such a current sensor that only needs to recognize the presence of a reverse current above a certain threshold value can be realized in a very simple way, for example by means of a contact that is closed due to a magnetic field caused by the reverse current. Generally, the current sensor used according to the invention has the advantage that it does not cause power loss in normal operation of the string which reduces the efficiency of the photovoltaic system. Thus, it essentially differs from fuses or diodes for the individual strings.

In the new photovoltaic system and the new apparatus, the current sensors may additionally measure the strength of the currents flowing from the strings in forward direction and report them to a surveying device for the strings. This may correspond to the string fault monitoring known as such.

In other words, the current sensors of an existing string fault monitoring which measure the currents from the strings by value and direction and report these values to the controller of the converter may be used for realizing the photovoltaic system or apparatus according to the invention. It may be sufficient to modify the controller according to the present invention by inputting a modified controller software.

As already indicated, in one embodiment of the new photovoltaic system and the new apparatus, the terminals for the individual strings do not comprise diodes and/or over-current fuses, wherein the strings themselves (which each only comprise photovoltaic modules connected in series) are also not being protected by such diodes or over-current fuses. Instead, the efforts spent for this are purposefully saved in the present invention both with regard to the aspect of construction as to the aspect of the permanent power losses. The connection units of the new photovoltaic system and the new apparatus may thus—besides the current sensors—essentially be made of current collecting rails which may also overtake the constructional function of the connection units.

Advantageous further developments of the invention result from the claims, the description and the drawings. The advantages of features and of combinations of a plurality of features mentioned at the beginning of the description only serve as examples and may come into effect alternatively or cumulatively without the necessity of embodiments according to the invention having to generate these advantages. Further features may be taken from the drawings, in particular from the illustrated geometries and the relative dimensions of a plurality of components as well as from their relative arrangement and their operative connection. The combination of features of different embodiments of the invention or of features of different claims is also possible independently of the chosen references of the claims, and it is motivated herewith. This also relates to features which are illustrated in separate drawings, or which are mentioned when describing them. These features may also be combined with features of different claims. Furthermore, it is possible that further embodiments of the invention do without features mentioned in the claims.

BRIEF DESCRIPTION OF THE DRAWINGS

In the following, the invention will be further explained and described by means of an embodiment example with reference to the attached drawings.

DETAILED DESCRIPTION

The technical term string is based on the fact that usually a plurality of photovoltaic modules are connected in series to increase the output voltage of a photovoltaic generator with regard to the elemental voltage of one photovoltaic module. In the present description, the term string is actually primarily used for a pure series connection of photovoltaic modules. However, so far as this is not explicitly excluded, a string may also comprise a parallel connection of photovoltaic modules, even if this is not preferred in the context of the present invention.

Usually, the power grid into which a photovoltaic system feeds, or into which power is fed by an apparatus according to the present invention, is a one or three phase AC grid. It may be a public AC grid.

Figure 1:
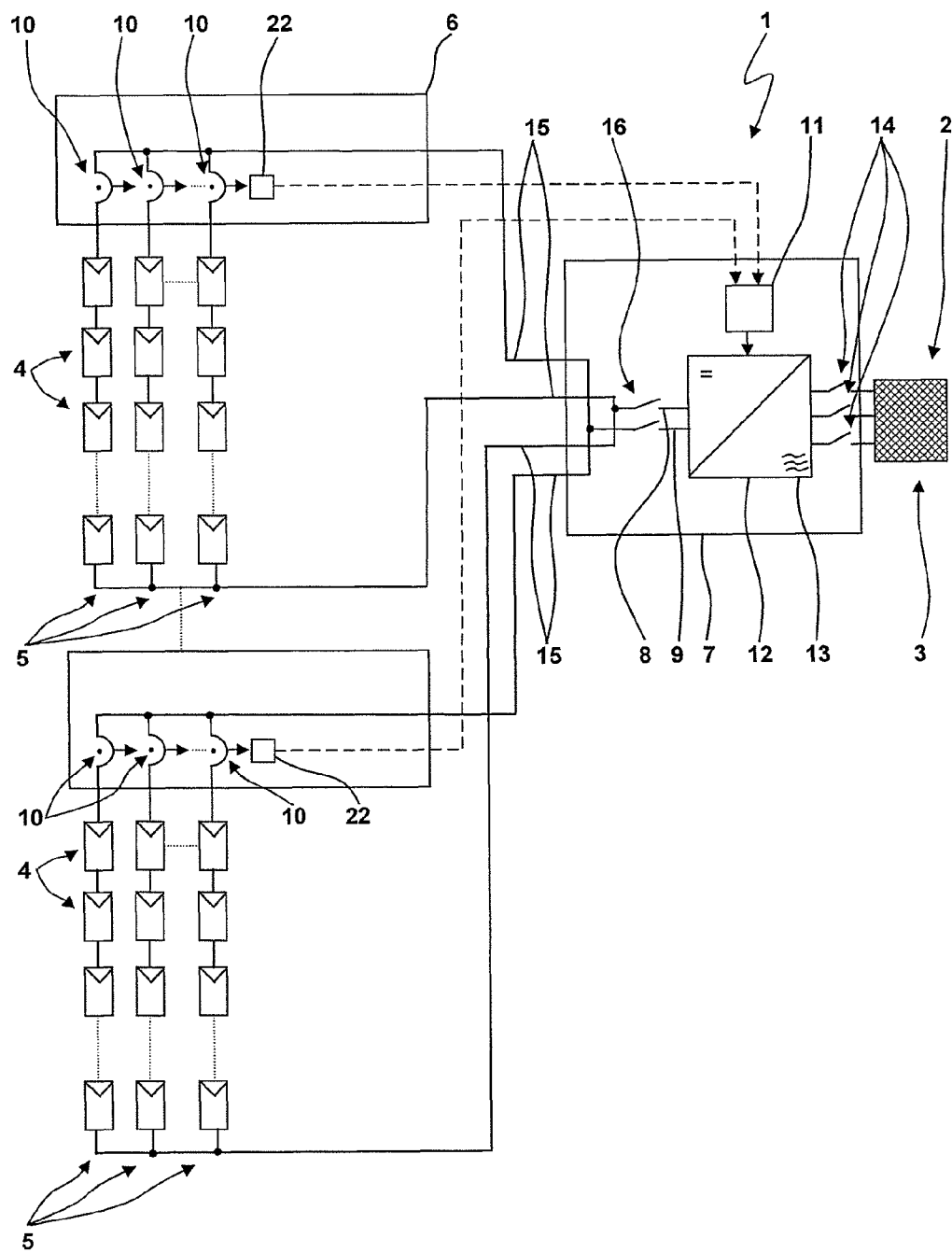
FIG. 1 schematically shows the construction of a photovoltaic system according to one embodiment.

FIG. 1 illustrates a photovoltaic system 1 for feeding electric energy into a power grid 2 which is an AC grid 3 here. The electric energy is generated by a plurality of photovoltaic modules 4, which are connected in series to form strings 5. The strings 5 are connected in parallel in groups by means of local connection units 6, before they are connected in parallel to each other to bus lines 8 and 9 in a central unit 7. In the connection units 6 one current sensor 10 is provided for each string, which at least reports to a controller 11 in the central unit 7 whether a reverse current through the respective string 5 occurs, i.e. a current in an opposite direction to the direction in which a current flows which is usually generated by the photovoltaic modules 4. For transferring the signals from the current sensors 10 to the controller 11, a transmitter 22 is provided in each connection unit 6 which wirelessly communicates with the controller 11. The transmitter 22 can send a signal not only then, when a reverse current occurs, but may also communicate which string 5 is affected thereby. Additionally, it may report the currents flowing from all strings 5 so that by monitoring the collective of these currents a string failure monitoring is possible. A significant reverse current, i.e. a reverse current exceeding a threshold value, that occurs is an indication of a fault of the associated string 5. It does not only mean a power loss, because this reverse current generated by the other strings is not fed into the power grid 2; but primarily is a potential danger particularly to the affected string 5. Thus, in the central unit 7, the controller 11 intervenes in the operation of the converter 12 by which the electric energy from the strings 5 is fed into the power grid. The converter 12 is indicated as a three-phase inverter 13 here, which is connected to the power grid 2 via contactors 14. At its input side, connection lines 15 from the connection units 6 are connected to the bus lines 8 and 9 through which the photovoltaically generated current flows to the inverter 13 via an all-pole switching power switch 16. The reported reverse currents modify the operation of the controller 11 which—without the occurrence of the reverse current—is designed to adjust the input voltage of the converter 12 present between the bus lines 8 and 9 in such a way that a maximum electric power is generated by the solar modules. To stop an occurring reverse current, the controller 11 reduces the system voltage present between the bus lines 8 and 9 which also drops over the individual strings 5. This reduction goes so far that the voltage present over the string affected by the reverse current is no longer sufficient to cause the reverse current. In an individual case, this may mean that the voltage between the bus lines 8 and 9 is reduced to zero. As long as this is not the case or as long as the system voltage present between the bus lines 8 and 9 is still sufficient for that the converter 12 can feed electric energy into the power grid 2, further electric energy is fed from the non-faulty strings into the power grid 2.

Figure 2:
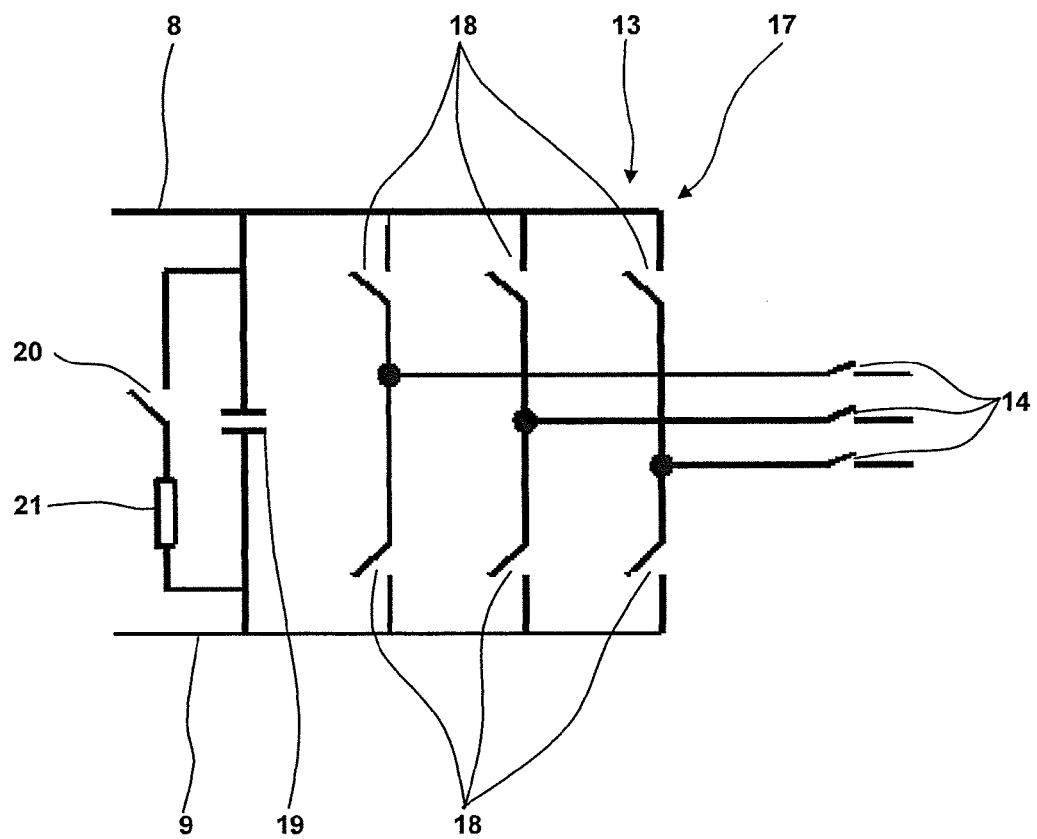
FIG. 2 illustrates the construction of the central converter of the photovoltaic system according to FIG. 1 according to one embodiment.

FIG. 2 illustrates a construction of the inverter 13 and the contactors 14 at its output side. The inverter 13 comprises an inverter bridge 17 with six switches 18 which are pulsed by the controller 11 according to FIG. 1 to feed a three-phase AC current into the connected power grid in case of normal operation. At the input side of the inverter 13, a buffer capacitance 19 is provided between the bus lines 8 and 9. In addition to that, the inverter 13 may comprise intermediate links not depicted here. If the system voltage present between the bus lines 8 and 9 has to be reduced down to zero to stop a backflow through one of the strings 5 according to FIG. 1, the controller 11 according to FIG. 1 disconnects the photovoltaic system by opening the contactors 14 from the power grid. Then, the buffer capacitance 19 is discharged by closing a switch 20 via a discharging resistor 21. Afterwards, all switches 18 are closed to short the bus lines 8 and 9. The switches 18 usually existing in an inverter 13 are suitable for such a shorting without further measures as they have anyway to be designed for the open-circuit voltage of the strings connected to the bus lines 8 and 9 and for the flowing maximum currents.

The invention claimed is:

1. A photovoltaic system comprising a plurality of strings which each comprise a plurality of photovoltaic modules exclusively connected in series, bus lines to which the plurality of strings are connected together in parallel, wherein a current sensor is provided for each string and is configured to determine whether a reverse current flows to the respective string, and a converter configured to feed electric energy from the bus lines into a power grid, wherein a system voltage drop between the bus lines can be adjusted by means of a controller of the converter, and wherein each current sensor reports to the controller of the converter whether a reverse current flows to the respective string, and wherein the controller of the converter reduces the system voltage present between the bus lines to stop the reverse current in response thereto, wherein, after the reduction of the system voltage between the bus lines, the other strings not associated with the reverse current flow further supply electric energy that the converter feeds into the power grid as long as the reduced system voltage between the bus lines is sufficient for feeding electric energy into the power grid.

2. An apparatus for feeding electric energy from a plurality of strings, which each comprise a plurality of photovoltaic modules connected in series, into a power grid, the apparatus comprising terminals to connect the plurality of strings together in parallel to each other to bus lines, wherein for each string a current sensor is provided that is configured to determine whether a reverse current flows to the respective string, and a converter that feeds the electric energy from the bus lines into the power grid, wherein a system voltage drop between the bus lines is adjustable by a controller of the converter, wherein each current sensor reports to the controller of the converter whether a reverse current flows to the respective string and wherein the controller of the converter reduces the system voltage present between the bus lines to stop the reverse current, wherein, after reduction of the system voltage between the bus lines the other strings not associated with the reverse current flow further supply electric energy that the converter feeds into the power grid, as long as the reduced system voltage between the bus lines is sufficient for feeding electric energy into the power grid.

3. The apparatus according to claim 2, wherein the controller is configured to reduce the system voltage present between the bus lines within a present maximum power point (MPP) window.

4. The apparatus according to claim 3, wherein the controller is configured to reduce the system voltage present between the bus lines down to zero if the reverse current can not be stopped otherwise.

5. The apparatus according to claim 4, wherein the controller is configured to short the system voltage present between the bus lines if the reverse current can not be stopped otherwise.

6. The apparatus according to claim 5, wherein the controller is configured to disconnect the converter from the power grid, discharge a buffer capacitance at the input side of the converter and short the system voltage present between the bus lines via switches of an inverter bridge of the converter.

7. The apparatus according to claim 1, wherein the current sensors are provided in a plurality of connection units to be arranged locally.

8. The apparatus according to claim 7, wherein in a central unit including the converter, connection terminals to the bus lines are provided for connection lines coming from the connection units that are to be arranged locally.

9. The apparatus according to claim 1, wherein the current sensors are configured to report the reverse current via communication lines or wirelessly to the controller.

10. The apparatus according to claim 1, wherein the current sensors are configured to report the reverse current, if the reverse current exceeds a predetermined threshold value.

11. The apparatus according to claim 1, wherein the current sensors are configured to measure a strength of the currents flowing from the strings and report it to a monitoring device.

12. The apparatus according to claim 1, wherein the current sensors are configured to measure the currents flowing from the strings with regard to value and direction.

13. The apparatus according to claim 1, wherein no diodes are provided for the individual strings.

14. The apparatus according to claim 13, wherein no overcurrent fuses are provided for the individual strings.

15. An inverter control system, comprising:
an inverter configured to receive electric energy at bus lines provided thereto, and deliver electric energy to a grid at an output thereof;
a local connection unit comprising a plurality of current sensors, wherein each of the plurality of current sensors is configured to detect a reverse current flow associated with a respective one of a plurality of parallel-connected strings of series-connected photovoltaic modules;
a controller configured to receive an indication from one of the plurality of current sensors when the reverse current flow is detected, and wherein the controller is configured to control the inverter in response thereto to reduce a system voltage at the bus lines,
wherein the reduced system voltage is sufficient to stop the detected reverse current flow in the one string, and wherein the inverter is configured to receive electric energy from the other strings of the plurality of strings not associated with the detected reverse current flow.

16. The inverter control system of claim 15, wherein the local connection unit further comprises a transmitter configured to wirelessly transmit the indication of a detected reverse current flow from one of the plurality of current sensors to the controller.

17. The inverter control system of claim 15, wherein the inverter further comprises a plurality of contactors at an output thereof, and wherein the controller is configured to open the contactors and thereby disconnect the grid from the inverter if a predetermined condition is detected by the controller in the inverter when a reverse current flow is detected in one of the strings.

18. The inverter control system of claim 17, wherein the inverter further comprises a buffer capacitance, and wherein the controller is configured to discharge the buffer capacitance after the contactors are opened.

19. The inverter control system of claim 18, wherein the inverter comprises a bridge circuit between the bus lines, and wherein the controller is configured to close switches of the bridge circuit to create a short circuit between the bus lines after the buffer capacitance is discharged.

20. A method of controlling an inverter, comprising:
detecting a reverse current flow condition in one of a plurality of strings of series-connected photovoltaic modules;
reporting the detected reverse current flow condition to a controller associated with the inverter;
reducing a system voltage between bus lines at an input of the inverter in response to the report of the detected reverse current flow condition via the controller; and
receiving electric energy at the inverter at the reduced system voltage from others of the plurality of strings of series-connected photovoltaic modules not associated with the detected reverse current flow condition.

* * * * *